United States Patent [19]

Torre et al.

[11] Patent Number: 4,644,560
[45] Date of Patent: Feb. 17, 1987

[54] INTRANETWORK CODE DIVISION MULTIPLE ACCESS COMMUNICATION SYSTEM

[75] Inventors: Frank M. Torre, Smithtown; John F. Courtien, Glen Cove, both of N.Y.

[73] Assignee: Hazeltine Corporation, Commack, N.Y.

[21] Appl. No.: 714,296

[22] Filed: Mar. 21, 1985

Related U.S. Application Data

[63] Continuation-in-part of Ser. No. 407,980, Aug. 13, 1982, abandoned.

[51] Int. Cl.⁴ ............................................. H04J 13/00
[52] U.S. Cl. .......................................... 375/1; 455/38; 370/93
[58] Field of Search .................. 375/1, 2.1; 178/22.01, 178/22.17; 455/26, 31, 32, 38; 370/18, 91, 92, 93, 95, 96

[56] References Cited

U.S. PATENT DOCUMENTS

| | | | |
|---|---|---|---|
| 3,239,761 | 3/1966 | Goode | 370/93 |
| 3,432,619 | 3/1969 | Blasbalg | 370/93 |
| 3,562,431 | 2/1971 | Inose | 370/93 |
| 3,647,975 | 3/1972 | Goto et al. | 370/93 |
| 4,135,156 | 1/1979 | Sanders, Jr. et al. | 455/38 |
| 4,247,947 | 1/1981 | Miyamoto | 455/38 |

Primary Examiner—Benedict V. Safourek
Attorney, Agent, or Firm—E. A. Onders; F. R. Agovino

[57] ABSTRACT

A CDMA format is used within a network to permit communication between members of a network. Network members are synchronized to each other and are each aware of a predetermined set of code words which has been established. A member desiring to transmit data selects a code word from the predetermined set. If there are unused code words, one of the unused words is randomly selected. If all words are being used, the code word of the farthest user is selected. Since all members are synchronized in time to stable clocks, the range of each user is known. All members of the network are always listening and keeping track of detections of other users and code words. Transmitted signals are a series of pulses with a jitter or sync pulse inserted within each series. The number and location of sync pulses is unique for each code and defines the CDMA code of the signal. A pseudorandom noise generator synchronized to the clock is gated with coded data pulsed with appropriate jitter insertion and transmitted over a frequency determined by the pseudorandom number at any instant in time.

8 Claims, 6 Drawing Figures

DECODING RULE: PRESENT PLUS ONE OF PREVIOUS TWO
BINARY INTEGRATION RULE: UP/DOWN COUNTER WITH UP COUNT = 9, DOWN COUNT = 1, THRESHOLD = 28

| CDMA NUMBER | SUCCESSIVE SYNC INTERVALS | | | | | | | | | | | | |
|---|---|---|---|---|---|---|---|---|---|---|---|---|---|
| | 1 | 2 | 3 | 4 | 5 | · | · | 21 | 22 | 23 | 24 | 25 | · · |
| (C²) L0 | 0 | 0 | 0 | 0 | 0 | · | · | 0 | 0 | 0 | 0 | 0 | · · |
| L1 | 0 | 1 | 2 | 3 | 4 | · | · | 20 | 21 | 22 | 0 | 1 | · · |
| L2 | 0 | 2 | 4 | 6 | 8 | · | · | 17 | 19 | 21 | 0 | 2 | · · |
| L3 | 0 | 3 | 6 | 9 | 12 | · | · | 14 | 17 | 20 | 0 | 3 | · · |
| L4 | 0 | 4 | 8 | 12 | 16 | · | · | 11 | 15 | 19 | 0 | 4 | · · |
| · | · | · | · | · | · | · | · | · | · | · | · | · | · · |
| · | · | · | · | · | · | · | · | · | · | · | · | · | · · |
| · | · | · | · | · | · | · | · | · | · | · | · | · | · · |
| L7 | 0 | 7 | 14 | 21 | 5 | · | · | 2 | 9 | 16 | 0 | 7 | · · |

NOTE: JITTER OVERLAY CODE IS MODULO-23 (IN GENERAL, CODE IS MODULO-N WHERE N IS PRIME NUMBER ≥ 13)

INTRANETWORK CODE DIVISION MULTIPLE ACCESS COMMUNICATION SYSTEM

The Government has rights in this invention pursuant to Contract No. F30602-78-C-0067 awarded by the Department of the Air Force.

This application is a continuation-in-part of application Ser. No. 407,980 filed Aug. 13, 1982, now abandoned.

BACKGROUND OF THE INVENTION

1. Field of the Invention

The invention relates generally to communication systems and, in particular, to communication systems employing code division multiple access.

2. Background of the Invention

Code division multiple access communication systems are well known in the prior art. Such systems assign codes to users according to a demand access (or floating assignment) priority or may use pre-assigned codes. In the former case, assignments of the codes may be controlled or self-selecting (autonomous) controlled assignments which tend to limit the system operating parameters. In the latter case of a multiple member network in which two or three members may be simultaneously communicating, pre-assigning of codes becomes very complex and is a limiting factor in the number of members which can be a part of the network.

SUMMARY OF THE INVENTION

It is an object of this invention to provide a communication system employing code division mulitple access (CDMA) in a floating assignment or demand access mode.

It is another object of this invention to provide a CDMA communication system which self-selects codes without a network-controlled master.

The invention includes an apparatus for transmitting digital data within a network made up of a plurality of the apparatus. The apparatus includes a clock and first means for coding digital data to be transmitted. Second means monitors the transmission within the network. Third means selects a code word from a predetermined set of code words within the network and is responsive to the second means. Fourth means defines a carrier frequency, a timing delay and a phase, the fourth means being responsive to the third means and the clock. Fifth means generates a signal representing the digital data and based on the phase information and the timing delay and modulates the representative signal onto the carrier signal. Sixth means transmits the modulated carrier signal.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
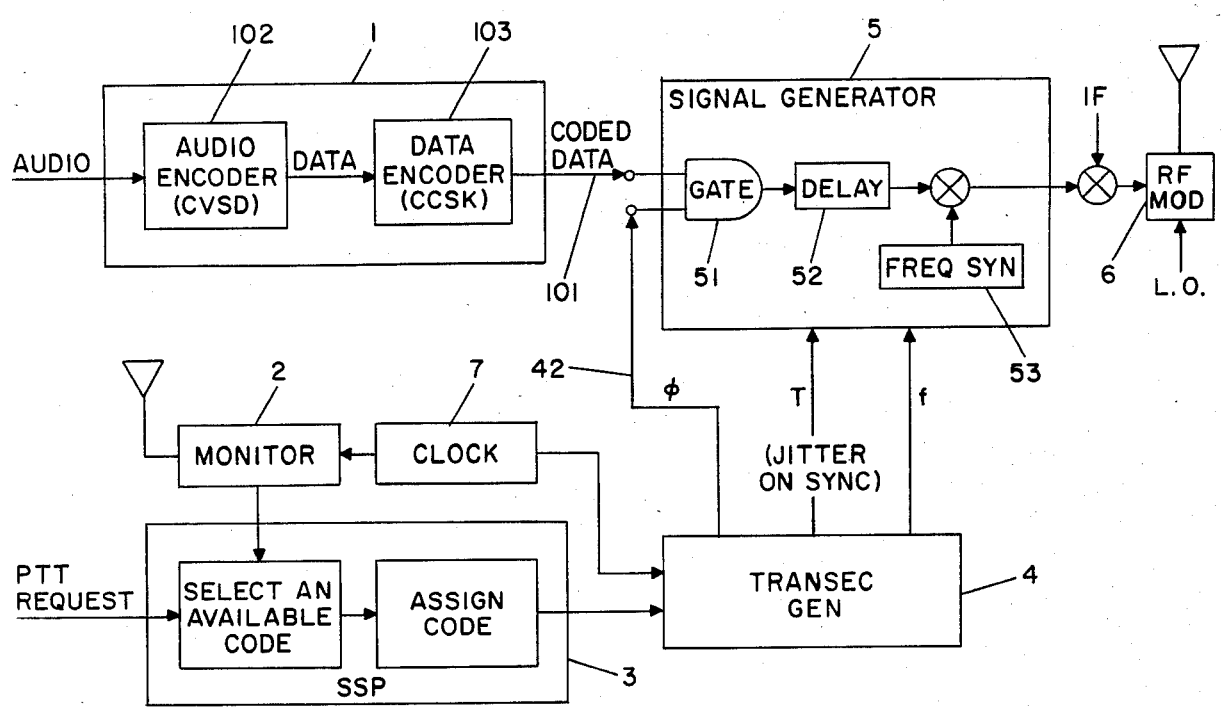
FIG. 1 is a block diagram illustrating the transmitter portions of a radio according to the invention.

The invention relates generally to the transmission of digital data. Digital data to be transmitted may be provided by any source and is referred in FIG. 1 as coded data transmitted via line 101. Block 1 refers to a first means for providing digital data to be transmitted as coded data via line 101. As illustrated in FIG. 1, the coded data may be derived from and represent audio information which is applied to audio encoder 102 followed by data encoder 103. Audio encoder 102 may be any known system for digitally encoding audio information such as a continuously variable slope delta (CVSD) modulation system. The data output of encoder 102 may be digitally encoded by a standard mapping technique such as cyclic code shift keying (CCSK) or any other keying system known in the prior art. For CCSK, five bits of data at a time are mapped into one of thirty-two chip symbols. Four of such symbols are associated together to form one pulse of coded data provided via line 101.

In pre-assigning CDMA systems, each member of a network is normally provided with a code. However, usually only a few (two or three) members are communicating at any given time and it is only necessary for codes to be assigned to those members which are communicating. When the number of members in a given network is large, pre-assigning each member a different code becomes a complex problem since each member must be able to detect the codes of all other members of the same network. In demand access CDMA, a control or master for each network is required to monitor code assignments. The need for such a control or master is an unnecessary limit on the system.

Figures 5, 6:
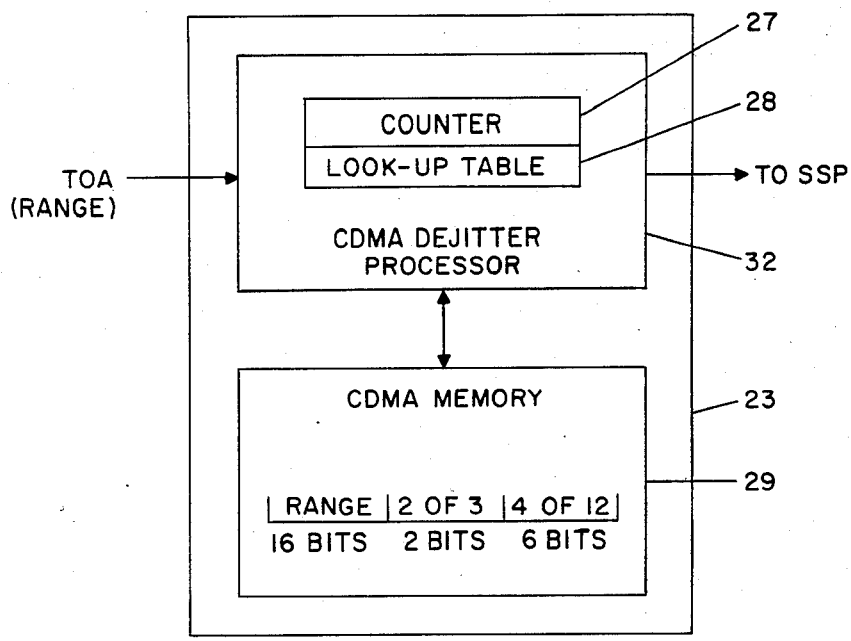
FIG. 5 is a detailed block diagram illustrating the signal detector 23 of FIG. 4.
FIG. 6 is a look-up table illustrating an eight code CDMA system based on modulo-23 according to the invention.

The present invention minimizes these problems by predetermining a set of code words (see FIG. 6; L0–L7) and permitting each member to select its own code word. The set of code words is sufficiently large to avoid unauthorized detection and deciphering in a short period of time. The actual number of code words in the set is based on the anticipated number of members which would be communicating during a given period of time and the security desired.

Rather than pre-assigning code words to each member, the invention employs floating assignment or demand access of the code words without the need for a control or master. Each member is familiar with the set of, for example, eight code words and continuously monitors all network transmissions by other members in order to keep track of the use of the code words and the range of the user within the network. When a network member desires to transmit information, a push-to-talk (PTT) request is provided to third means 3 for selecting a code word from the predetermined set of code words within the network. The means for selecting 3 is responsive to the second means 2 which is continuously monitoring transmissions within the network and advises third means 3 of the code words which are being used and the range of the user of each code word being used.

Figure 3:
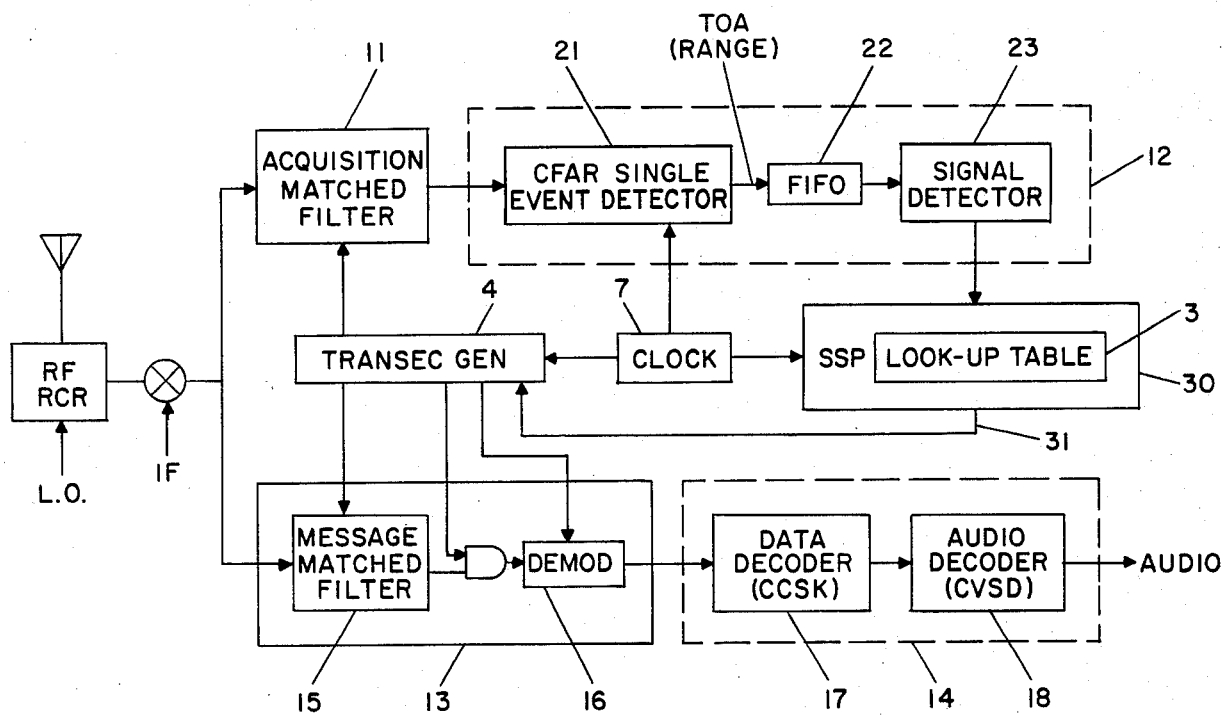
FIG. 3 is a block diagram illustrating the receiver portions of a radio according to the invention and particularly the monitor 2 illustrated in FIG. 1.

Monitor 2 is always receiving and acquiring network users and determines the range and CDMA code number of each network user. FIG. 3 illustrates monitor 2 in greater detail and will be discussed below. Monitor 2 periodically updates the signal selection processor (SSP) 3 which includes a look-up table 30 (see FIG. 3) for designating the code to be used. In general, monitor 2 stores the range of closest user on each code word, if any. This information is provided to SSP 3. The look-up table 30 designates an unused code word for use upon receipt of the PPT request; or if no code words are available because all are in use, look-up table 30 designates a code whose closest user is furthest away.

In summary, a unique aspect of the invention is the avoidance of pre-assigned codes or the need for particular codes dedicated to particular users or particular functions. Monitor 2 is always receiving and searches for pulses (codes) which are valid at that instant in time.

One aspect of the system which allows it to function in the above-described manner is its synchronization. Each transmitter/receiver includes a highly accurate time of day clock such as a rubidium device. Generally, it is contemplated that these clocks are synchronized at the beginning of each period of use of the network so that synchronization between network members is valid for a finite period of time, such as four hours.

As used herein and illustrated in FIG. 6, each CDMA code is actually a slightly different pulse spacing which can be correlated to the highly accurate time of day clocks carried by each member of the network. Essentially, each radio transmission within the network is a continuous stream of pulses augmented by the insertion of a sync pulse every 2.5 milliseconds. The CDMA code is defined by jittering the sync pulse (i.e., adjusting the sync pulse position) within the appropriate interval as illustrated in FIG. 6. The integers 0-22 of the Table of FIG. 6 represent the multiples of the jitter time increment used. For example, for CDMA number L4 for interval 5, the jitter would be 16 times the jitter time increment, so that for a 13 microsecond jitter increment the sync pulse position is delayed by 16×13 microseconds or 208 microseconds. Each receiver is familiar with the code pattern which is described in FIG. 6 and results in unambiguous patterns for each CDMA number. The monitor 2 does not know which code is coming and merely detects pulses in 2.5 millisecond intervals. Every code has a slighly different spacing due to the interpulse addition of a sync pulse and depending on the time of day. The spacing is measured by monitor 2 and permits monitor 2 to determine the particular code word since monitor 2 is informed of all known spacings at any particular instant in time.

Synchronization pulses are added to the transmission according to parameters determined by transmission security (transec) generator 4. As used herein, the sync pulses which are added at the 2.5 millisecond spacing are referred to as jitter or jittered pulses.

Figure 2:
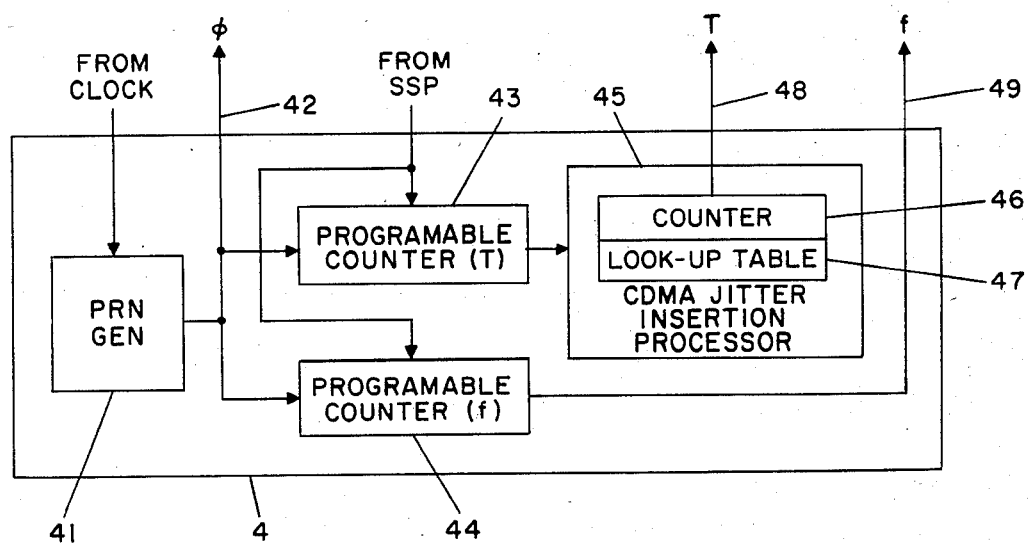
FIG. 2 is a block diagram illustrating the transmission security (transec) generator 4 illustrated in FIG. 1.

Transec generator 4 as illustrated in FIG. 2 includes a pseudorandom noise (PRN) generator 41 which is synchronized to clock 7 so that all PRN generators in the network produce the same random sequence at any instant in time. This pseudorandom sequence is provided via line 42 to signal generator 5 wherein it is gated with the coded data provided by line 101. Any standard gating technique may be used by employing gate 51 (such as an AND gate) to merge the pseudorandom noise with the coded data. The output of PRN generator 41 is also provided to programmable counters 43 and 44 which assist in determining the pulse rate and frequency of the signal to be transmitted. In particular, programmable counter 43 periodically indicates to CDMA jitter insertion processor 45 that a particular count has been reached and that a sync pulse or jitter should be inserted. SSP 3 indicates to the programmable counters 43 and 44 which code has been selected so that the appropriate count can be made. CDMA jitter insertion processor 45 includes counter 46 and look-up table 47 which define the appropriate pulse spacing and the appropriate point at which sync pulses are to be inserted. Similarly, programmable counter 44 counts and provides information determining the frequency of the signal to be transmitted at any instant in time. Since transec generator 4 is synchronized to clock 7 and all clocks within the network are synchronized, each network member knows at any instant of time the PRN generator 41 output and the phase, frequency and delay spacing for each particular code. The delay spacing information is provided via line 48 to delay 52 and the frequency selection information is provided via line 49 to frequency synthesizer 53. Synthesizer 53 generates a signal at the appropriate frequency at any instant in time (frequency hopping is contemplated) which is mixed with the gated, coded, delayed, pulsed data.

Figure 4:
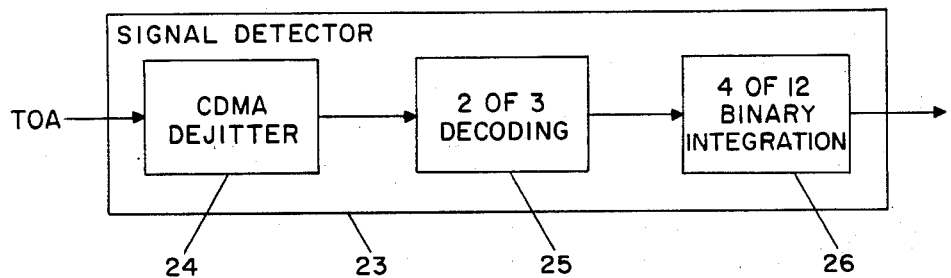
FIG. 4 is a functional block diagram illustrating the signal detector 23 shown in FIG. 3.

The block diagrams of the invention have been split up into the transmitter portion illustrated in FIGS. 1 and 2 and the receiver portion illustrated in FIGS. 3-5. However, the radio according to the invention is a single merged transceiver which uses common pieces of hardware for transmission and reception. For convenience, the transmission and reception functions are being separately discussed. In general, monitor 2 is essentially the portions of FIGS. 3-5 which do not appear in FIGS. 1 and 2.

As shown in FIG. 3, the receiver according to the invention includes acquisition matched filter 11 which is programmed by transec generator 4. The purpose of filter 11 is to continuously filter the incoming signal in accordance with the various known codes in an attempt to filter out all signals except those in which existing codes are being used. All codes are sequentially (essentially simultaneously) searched by the acquisition matched filter 11 by a continuous switching process. The purpose of signal detector 12 is to look for jitter and determine whether or not a signal passed by filter 11 includes the appropriate pulse spacing with jitter.

Detector 12 includes constant false alarm rate (CFAR) single event detector 21 which is a pulse splitter for providing time of arrival (TOA) or range information. This information is provided to the first in, first out (FIFO) buffer 22 followed by signal detector 23 which is illustrated in more detail in FIGS. 4 and 5. Signal detector 23 performs CDMA dejitter 24 followed by two of three decoding 25 following by four of twelve binary integration 26.

CFAR single event detector 21 is essentially a pulse splitter which detects the leading and trailing edge of each pulse and determines the centroid of each incoming pulse acquired by matched filter 11. In addition, detector 21 includes a feedback loop which depends on the ambient noise so that a constant false alarm rate is generated. Essentially, the pulse splitter which is part of detector 21 has a particular threshold which is variable depending on the signal quality. This aspect of the receiver is primarily needed to enhance acquisition when frequency hopping is used. The output of detector 21 is referred to as time of arrival (TOA or range) information because detector 21 is synchronized to clock 7 which is synchronized within the network. Therefore, depending upon the arrival time of a pulse of a signal, as compared to the clock time, the range of the particular network member which originated the signal is determined. This information is provided to buffer 22 so that information may be provided to detector 23 at a constant rate.

Signal detector 23 is illustrated in detail in FIG. 5. TOA-range information is provided to CDMA dejitter processor 32 which includes a counter 27 and look-up table 28. Once again, dejitter processor 32 is synchronized to the system and is aware of the look-up table as illustrated in FIG. 6 so that the particular code at any instant in time are known. Processor 32 processes the TOA-range information and provides such information to CDMA memory 29. Essentially, CDMA memory 29 has eight 24 bit blocks, one for each code. The TOA-range information is processed for each code and the results are stored in the corresponding code block. The first sixteen bits of the 24 bit block indicate range, the next two bits the two of three decoding and the last six bits indicate four of twelve binary integration.

The three functions of signal detector 23 perform in the following manner. CDMA jitter for the particular code being evaluated is detected which results in range information being inserted into the first sixteen bits of CDMA memory block 29. The binary number one (01) is placed in the two bits of the two of three memory block indicating that a decoding has occurred during one of the previous two events. Binary integration 26 includes an up/down counter with a threshold of, for example, 28. An up count is provided when a decoding pulse correlates with a previous entry and either of the two bits from the two of three block is one. A down count is provided when a detection has not been encountered. For one embodiment of the system, the up count may be 9 and the down count may be 1 with a threshold of 28. The next code is then evaluated for the pulse and the appropriate CDMA memory block 29 is similarly updated. For each interval dejitter processor 32 updates CDMA memory 32, multiplies the two of three block by two and adds one or zero for detection or no detection. The updated memory is evaluated to determine whether or not the thresholds have been reached. The thresholds are reached when the range information is present, the two bits of the two of three decoding indicate that two of the last three decodings have been successful and the four of twelve threshold (28) has been reached.

Successful decoding is indicated by the CDMA dejitter processor 32 to the signal selection processor 3 including a look-up table 30. SSP 3 is also synchronized to clock 7 and uses look-up table 30 to assist in determining the phase, delay and frequency information which must be provided to transec generator 4 via line 31. This information is provided to transec generator 4 to control message matched filter 15 so that the audio message can be demodulated. Transec generator 4 controls message matched filter 15 by providing phase, delay and frequency information so that the audio information may be recovered. In addition, transec generator 4 includes the PRN generator and provides this information to gate 31 so that the noise may be stripped from the incoming signal. The output of matched filter 13 is provided to demodulator 16 which uses the frequency information to provide the demodulated information to decoder 14 including data decoder 17 followed by the audio decoder 18 so that audio information may be recovered.

In summary, the receiver functions of the radio according to the invention are always listening. Each radio keeps track of initial detections of each code. These detections are correlated in a table. The range of each user is also monitored. This information serves two functions. It allows the SSP 3 to assign a code word in the event that the transmitter receives a PTT request. In addition, it allows the receiver to decode a message in the event that a detection occurs. All radios are synced within the network, are provided with synced pseudorandom generators and derive the same frequency phase and time delay information from the same look-up tables.

The basic look-up table information is shown in FIG. 6. The PRN generator is responsive to this information and the time delay and frequency are based on this information. Each CDMA code number (L0–L7) is assigned a series of successive sync intervals which are unambiguous. The assigned interval determines when the jitter (or sync) and how often the jitter is inserted into a pulse stream. All look-up tables in the radio are derived from and related to this basic information.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for transmitting digital data within a network made up of a plurality of the appratus, said apparatus comprising:
   a clock;
   first means for coding the digital data to be transmitted;
   second means for monitoring the transmissions within the network and for determining unused code words;
   third means for selecting a code word from the set of unused code words determined by said second means;
   fourth means for defining a carrier frequency, a jitter-insertion timing delay and a phase based on the code word selected by said third means, said fourth means synchronized to the clock;
   fifth means for generating a representative signal representing the digital data having a phase corresponding to the phase defined by the fourth means and having a sync pulse with a timing delay corresponding to the timing delay defined by the fourth means, and for modulating the respresentative signal onto the carrier signal; and
   sixth means for transmitting the modulated carrier signal.

2. The apparatus of claim 1 wherein said second means for monitoring comprises:
   an acquistition matched filter for filtering any incoming signals, said acquisition filter controlled by said fourth means and matched to the codes of the predetermined set;
   means for detecting the codes embodied in output signals provided by the matched filter;
   means for demodulating including a message matched filter responsive to the fourth means, and for filtering the incoming signal in response to the means for detecting; and means for decoding the demodulated data.

3. The apparatus of claim 2 wherein said third means comprises a source selection processor including a look-up table for defining a code word to be used and assigning the selected code word.

4. The apparatus of claim 3 wherein said fourth means comprises a transec generator including: a pseudorandom noise generator providing psuedorandom noise as the phase information to be combined with the coded digital data provided by the first means; first and second programmable counters responsive to the source selection processor for defining the timing delay and the carrier signal; and a jitter insertion processor for adjusting the sync pulse location of the representative signal in response to the first counter, said jitter insertion processor including a look-up table defining the successive jitter intervals.

5. The apparatus of claim 4 wherein said fifth means comprises a signal generator including: means for gating the pseudorandom noise with the coded digital data; means for delaying the gated data in response to the timing delay provided by the trasec generator; a frequency synthesizer responsive to the transec generator for generating the carrier signal; means for mixing the delayed, gated data with the carrier signal.

6. The apparatus of claim 5 wherein said means for detecting comprises: a pulse splitter for determining the centroid of pulses provided by the acquisition filter; and a signal detector for evaluating successive pulses and indicating when such pulses correspond to a coded signal.

7. The apparatus of claim 6 wherein said signal detector comprises a dejitter processor for detecting jitter pulses in the pulse splitter output and for generating decoding information and binary integration information responsive to the pulse splitter output which is provided to the source selection processor.

8. The apparatus of claim 7 further including a look-up table defining successive sync intervals for each instant in time as specified by the clock.

* * * * *